April 2, 1946.  F. W. KUPPERSMITH  2,397,494
MEASURING DEVICE
Filed Nov. 30, 1942   4 Sheets-Sheet 2

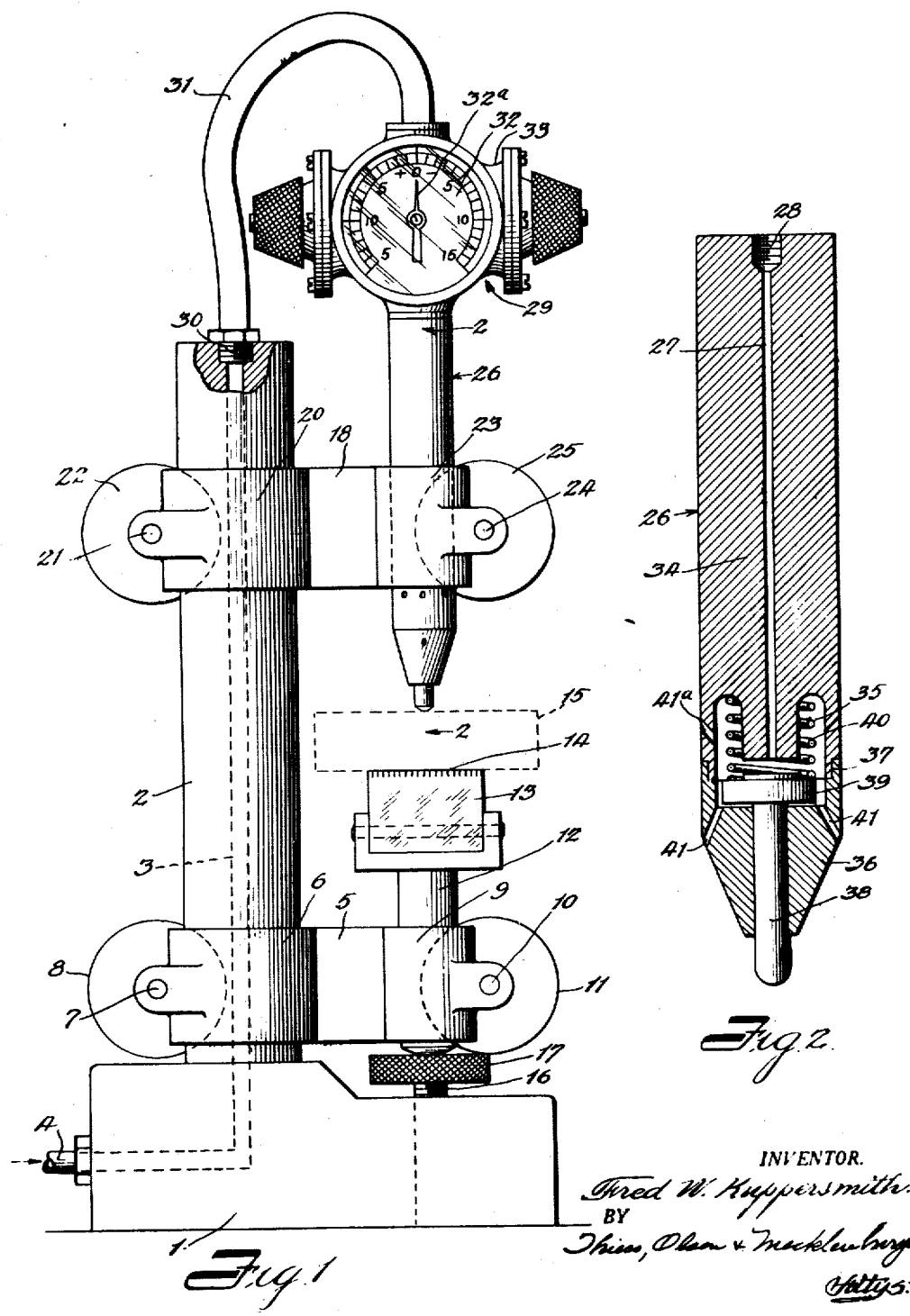

INVENTOR.
Fred W. Kuppersmith
BY
Thiess, Olson & Mecklenburger
Attys.

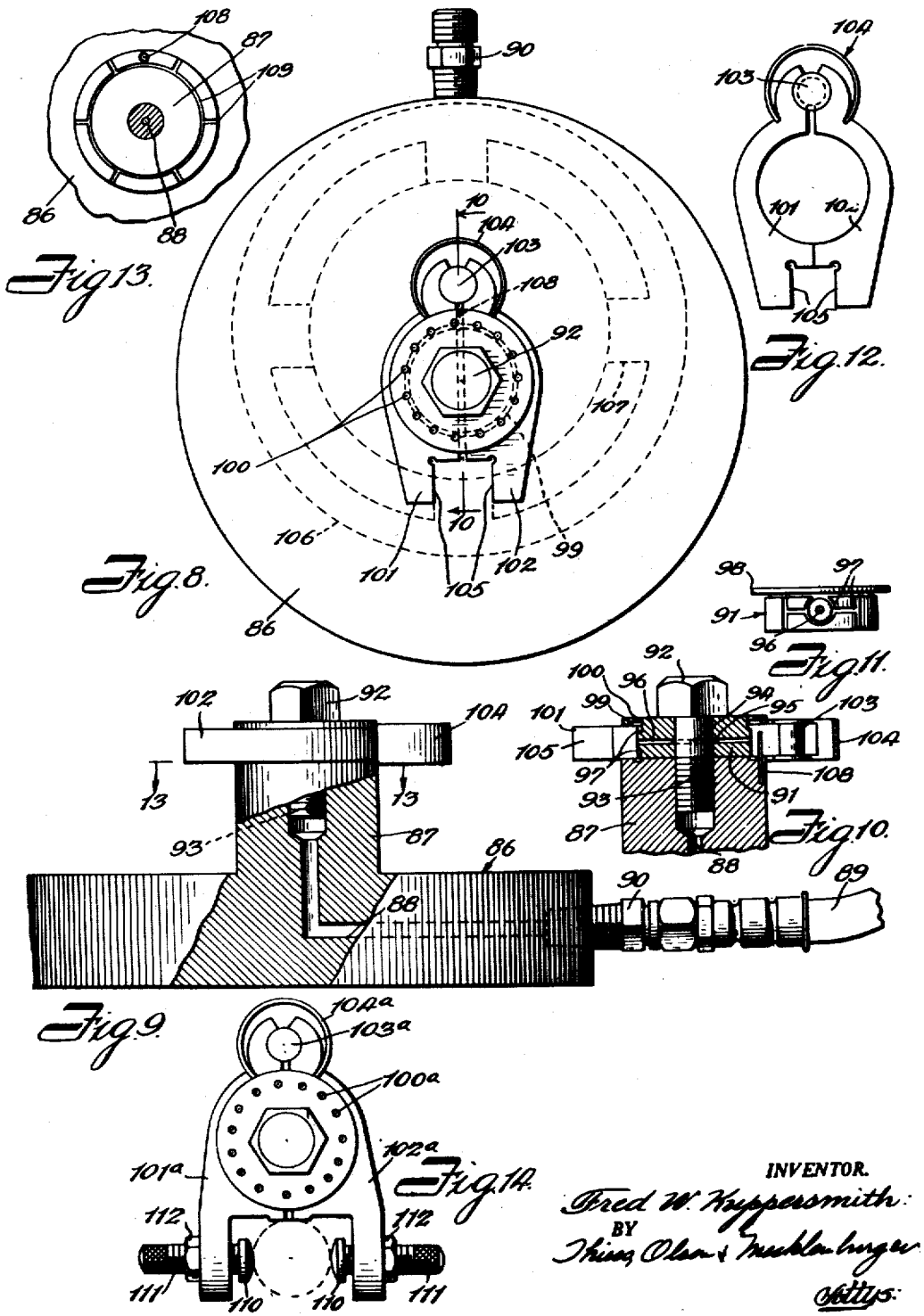

Patented Apr. 2, 1946

2,397,494

UNITED STATES PATENT OFFICE 2,397,494

MEASURING DEVICE

Fred W. Kuppersmith, Bloomington, Ill.

Application November 30, 1942, Serial No. 467,438

17 Claims. (Cl. 33—147)

This invention relates to a measuring device or gauge and more particularly to a pressure-controlled measuring device for accurately measuring finished workpieces wherein the workpiece dimension must be within a predetermined allowed tolerance in one or both directions from a critical predetermined dimension.

It is an object of the invention to provide an automatic self-indicating thickness gauge which will accurately measure a dimension of a workpiece and simultaneously indicate any variation thereof from a standard dimension; also, in which a workpiece may quickly be positioned for automatic measurement without manual manipulation of any elements of the measuring device.

A further object is to provide a measuring instrument of the character described, which is pneumatically controlled and wherein it is only necessary to insert the workpiece between measuring surfaces, at least one of which is automatically movable to control the operation of a pneumatic pressure indicator to indicate any variation of the workpiece dimension from a standard dimension.

Another object is to provide a pneumatic gauge which may conveniently be adjusted to measure duplicate workpieces of any required thickness within the limits of the device.

It is also an object to provide a pneumatically operated measuring instrument in which the pneumatic pressure may conveniently be adjusted and normally maintained at a predetermined value and may automatically be varied to operate an indicator in accordance with the tolerance requirements of the workpieces to be measured.

Another object of the invention is to provide a measuring device of the character described which is capable of accurate operation in quantity production of workpieces, and which is of few parts, cheap to manufacture and assemble, convenient in use, and which will not easily get out of order.

Further objects will be apparent from the specification and drawings.

In the drawings:

Fig. 1 is a side elevation of one embodiment of the invention and illustrates a bench-type gauge having the measuring elements mounted on a suitable support in position for automatically measuring workpieces as they are positioned thereon.

Fig. 2 is an axial sectional view through the measuring head shown in Fig. 1, with the work contactor shown in elevation, and is taken on a line substantially corresponding to line 2—2 of Fig. 1.

Fig. 8 is a top view of still another embodiment of the invention and illustrates a special type of gauge mounted on a base and adapted for measuring workpieces in which the portions to be measured are normally inaccessible with the usual measuring instruments, one such workpiece being shown in dotted lines in this figure.

Fig. 9 is a side elevation, partially in section of the embodiment shown in Fig. 8, a portion of the base being broken away for purposes of illustration.

Fig. 10 is a detail view, partially in elevation and partially in section, taken on a line substantially corresponding to line 10—10 of Fig. 8.

Fig. 11 is a side elevation of the pneumatic terminal block or nozzle illustrated in Figs. 8 and 10 and illustrates the air channels leading to the gauge elements.

Fig. 12 is a top view of the assembled gauge elements as shown in Fig. 8.

Fig. 13 is a top view of the gauge supporting portion of the base of the device taken along the line 13—13 of Fig. 9 and illustrates the channels formed in the base.

Fig. 14 is a top view of a slightly modified form of work-contacting elements for use on a gauge similar to that shown in Figs. 8 to 13, inclusive.

Figure 3:
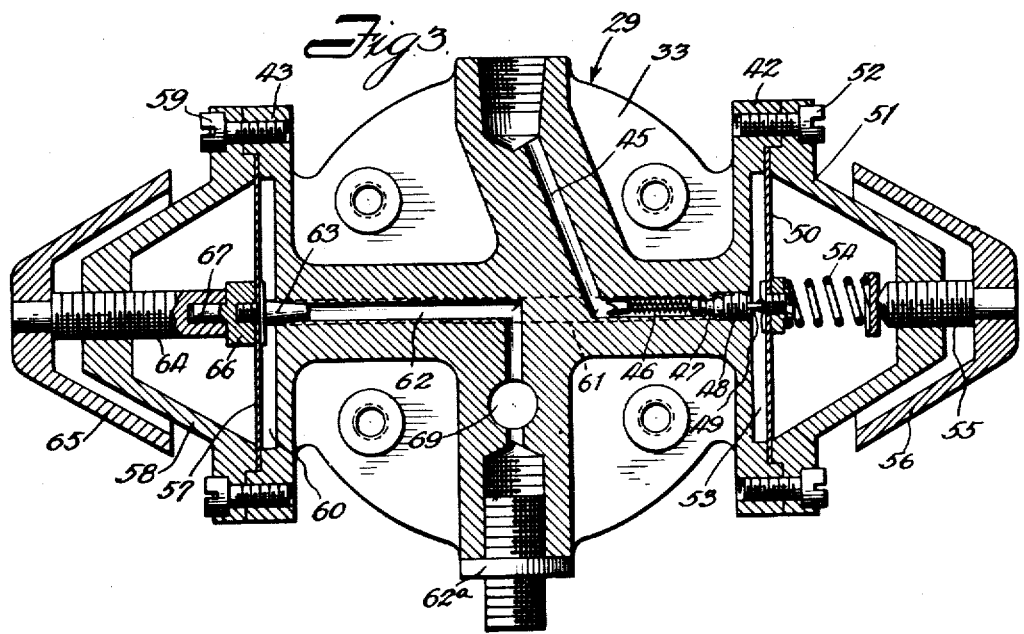
Fig. 3 is a view partially in section and partially in elevation through the combined pressure control valve and indicator shown in Fig. 1. This view is taken on line 3—3 of Fig. 4.
Figure 4:
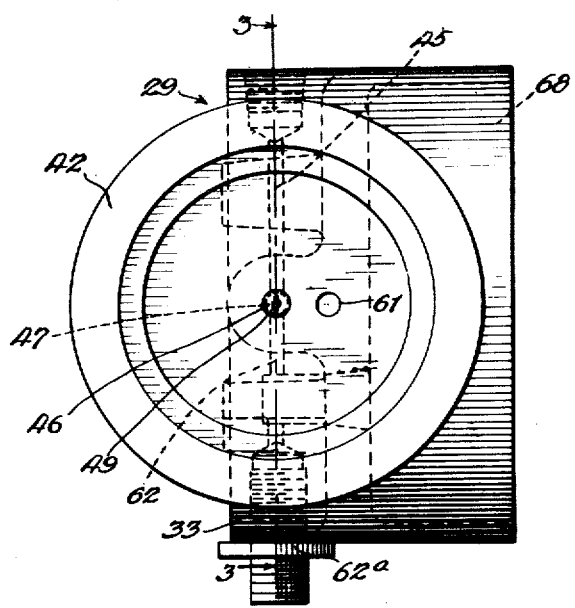
Fig. 4 is a right-hand end elevation of the pressure control device shown in Fig. 3 with the right-hand diaphragm and adjusting elements therefor removed.

Referring to the drawings in detail, the embodiment illustrated in Figs. 1 to 4, inclusive, comprises a base 1 on which is supported a vertical post 2. This post is provided with a pneumatic pressure passage 3 extending throughout its length and through the base 1 and terminating in an inlet 4. Any suitable pneumatic pressure source may be connected to this inlet. A vertically movable arm 5 is adjustably secured on the post 2 by means of a split clamping portion 6, whereby the arm may be clamped on the post by means of a threaded screw 7 having a hand wheel 8 thereon. The free end of the arm 5 is provided with a similar split clamping portion 9, and a similar clamping screw 10, having a hand wheel 11 thereon, is provided for clamping purposes.

A post 12 is adjustably supported in the clamping portion 9 of the arm 5, and is provided at its upper end with a platen or anvil 13 having an accurately machined measuring surface 14 to receive workpieces which may be positioned thereon. The workpieces may be of any predetermined thickness and may, for example, be of the type indicated by the dotted lines 15. The anvil post 12 is seated on an adjusting screw 16 which latter is provided with a hand wheel 17, so that the anvil may be vertically adjusted within reasonable limits without moving the clamp arm 5.

An upper clamp arm 18 is adjustably secured on the post 2 by means of a split clamp portion 20, a screw 21 and hand wheel 22. The free end of the arm 18 is provided with a clamp portion 23 and clamping screw and hand wheel 24 and 25, respectively. The clamp arm 18 and the clamping elements associated therewith may be identical with the clamp arm assembly 5 previously described.

An elongated cylindrical measuring head 26 is mounted in the clamp portion 23 of the upper arm 18 and is provided with an axial passage 27 (Fig. 2), the upper end of the passage being internally threaded at 28 to receive the outlet nipple of a pressure control valve 29, which latter is mounted on the measuring head as shown in Fig. 1. The inlet of the pressure control valve is connected to an outlet nipple 30 of the air passage 3 in the post 2, by means of a flexible conduit 31.

The pressure control valve 29 is provided with a dial pressure indicator 32, which latter may be of any suitable type, and is mounted on the casing 33 of the pressure control valve. This pressure control valve is adjustable normally to maintain a predetermined flow of air at a predetermined pneumatic pressure in the passage 27 of the measuring head and in a suitable passage leading to the dial indicator. The pressure control valve will be described in detail later.

The measuring head is shown in detail in Fig. 2 and comprises an elongated body portion 34 having a chamber 35 in the lower end thereof and a generally conical cap 36 secured thereto by threading thereon, or in any other suitable manner, as shown at 37.

A work contactor 38 is slidably mounted in the cap 36 and provided with a head or flange 39 that is housed in the chamber 35 as shown. A compression spring 40 normally retains the work contactor 38 at the limit of its extended movement, as illustrated, so that the upper surface of the head 39 is spaced somewhat from the adjacent outlet of the passage 27.

The measuring head cap 36 is provided with outlet passages or vents 41 communicating with the chamber 35. Vents 41a may also be provided in the walls of the chamber 35. It will, therefore, be apparent that as long as the work contact 38 is in its extreme lowered position as shown, there will be a continuous and regular flow of air through the passageway 27 at a predetermined pressure and predetermined volume and any variation in the pressure of the air in the passageway 27 will be indicated by the needle 32a of the dial indicator 32.

It will be apparent that if the work contactor 38 is raised by the insertion of a workpiece between the anvil 13 and the work contactor so that the head 39 of the work contactor tends to close the passage 27, then the flow of air through the measuring head will be restricted, the pressure therein will be increased, and the needle of the dial indicator will take a position corresponding to the thickness of the workpiece.

In practice, the correct spacing of the measuring surfaces (the work contactor 38 and the anvil 13) is adjusted by means of a master thickness block or gauge and the anvil may be raised or lowered by means of the adjusting screw 16 until the flange or head 39 of the work contactor restricts the air outlet a predetermined amount, so that the needle 32a of the indicator will stand at a desired point on the dial. For instance, the device may be adjusted so that the needle 32a stands exactly at "0" when a standard gauge block is positioned between the measuring surfaces, and it will be apparent that, when workpieces are inserted between the measuring surfaces, the pneumatic pressure in the passageway 27 will vary in accordance with any variation of the workpiece dimension from the standard dimension and the needle will take a position either to the right or left of the "0" point in accordance with the actual thickness of the workpiece in relation to the standard dimension.

The indicator dial may, of course, be graduated as required, and it should also be understood that it is not necessary to set initially the needle at "0" as the operation of my measuring device relative to an initially predetermined point on the dial will be the same irrespective of where the needle is positioned. However, the so-called "0" initial adjustment point assists in accurate reading of the measurements to determine if the workpieces being measured are within a predetermined tolerance.

The lower end of the work contactor 38 is rounded or otherwise shaped, so that the workpieces may be moved laterally into position on the platen in a manner automatically to raise the measuring element to cause an accurate setting of the indicator.

In the operation of the pneumatic gauge described in the foregoing, it is important that the supply of air or other fluid be maintained constant and at a predetermined pressure. A constant flow of air or other suitable fluid at a predetermined pressure may be insured by use of the control valve briefly indicated in the foregoing and illustrated in detail in Figs. 3 and 4. This valve comprises the valve casing 33 having oppositely disposed flanges 42 and 43 thereon, and an indicator may be mounted in the casing as shown in Fig. 1. The casing 33 is provided with a fluid inlet passage 45 communicating with the pressure source previously mentioned. The passage 45 terminates in an axial passage 46, in which latter is mounted a valve 47. The valve may be the ordinary Schroeder spring-type valve such as is commonly used in bicycle tires and automobile tires. This valve is threaded in the passage in the usual manner as shown at 48. The usual outwardly extending end 49 of the valve is in pressure engagement with a diaphragm 50, which latter is clamped and sealed against the flange 42 by means of a cone-shaped element 51 secured to the flange by means of the screws 52. This provides a shallow chamber 53 between the casing and the diaphragm and a spring 54 normally maintains pressure against the diaphragm to retain the valve 47 open a predetermined amount, so that a predetermined pressure flow may normally be maintained through the chamber 53. The compression of the spring 54 may be adjusted by means of an adjusting screw 55 having a cone-shaped knob 56 thereon. A proper adjustment of the knob 56 will control the valve 47 so that a predetermined pressure is maintained in the chamber 53 irrespective of variations in the pressure in the inlet passage.

The opposite end of the valve casing is of very similar construction to the end just described and comprises a diaphragm 57 clamped against the flange 43 by means of a cone-shaped clamping member 58 which latter may be secured by means of screws 59. This construction provides a shallow chamber 60 similar to the chamber 53, previously described, and these chambers are in communication through a passage 61 shown in dotted lines in Fig. 3, and in solid lines in Fig. 4. An outlet passage 62 communicates with an outlet nipple 62a, the casing being mounted on the measuring head 26 by means of the nipple so that the passage 62 in the casing communicates with the passage 27 in the head. A needle valve 63 is mounted on the diaphragm 57, and an adjusting screw 64 is mounted in the clamping element or cover 58 of the casing and is provided with an adjusting knob 65. The diaphragm is provided with a rearwardly extending stud 66 having a portion 67 slidably mounted in the end of the adjusting screw 64 so that the adjusting screw may be set to limit the maximum open position of the needle valve 63 and to retain this maximum open position against any pressure in the chamber 60. The pressure gauge which is mounted in a chamber 68 of the casing (Fig. 4), may be connected to the passage 62 in any suitable manner through a laterally extending passage 69 in which the inlet nipple of the pressure gauge may be threaded.

From the foregoing description, it will be clear that the pressure control valve serves to provide a constant flow of air at constant pressure to the measuring head irrespective of possible fluctuations in the air supply line. Thus, if the incoming air pressure in the passage 45 increases, then the valve 47 will tend to close against the pressure of the spring 54, and, if the pressure in the inlet passage 45 decreases, then the valve will tend to open because of the increased effectiveness of the spring 54. The needle valve 63 is adjusted to the maximum outlet flow desired, and the needle valve and diaphragm are free to move independently of the adjusting screw within the limits determined by the adjustment; therefore the pressure in the passage 62 leading to the measuring head will normally remain constant. The reading on the pressure gauge will be dependent on the back pressure from the passageway 27 which will in turn be determined by the relative positioning of the workpiece contactor or spindle 38.

Figure 5:
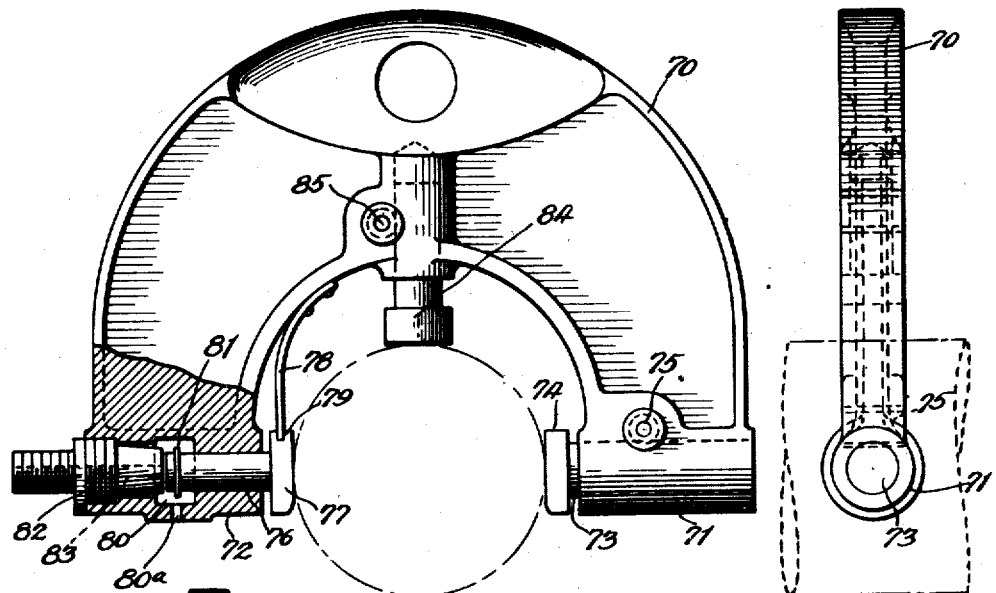
Fig. 5 is a side view of another embodiment wherein the measuring elements are mounted on a portable hand tool instead of on a stand. This embodiment is particularly useful for measuring cylindrical workpieces.
Figure 6:
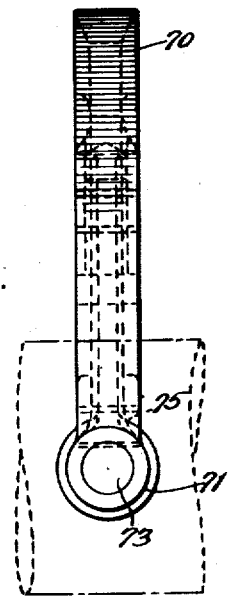
Fig. 6 is a side elevation of the embodiment illustrated in Fig. 5.
Figure 7:
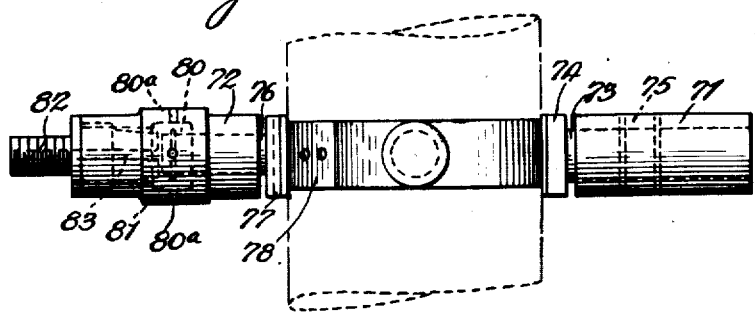
Fig. 7 is a bottom view of the embodiment shown in Figs. 5 and 6.

Figs. 5 to 7, inclusive, illustrate an embodiment in the form of a hand caliper, particularly adapted for measuring cylindrical workpieces. This embodiment comprises an arcuate frame 70 terminating in aligned bearing arms 71 and 72. The arm 71 has an anvil post 73 longitudinally adjustable therein and terminating in an anvil or platen 74. The anvil post 73 may be locked in any adjusted position by means of a hollow head set screw 75.

A spindle 76 is slidably mounted in the bearing arm 72 and is provided with a head 77 having a suitable contact surface for engaging a workpiece. A spring 78 is secured to the frame 70 and engaged in a slot 79 in the contact head 70. This spring normally retains the spindle and contact head in an outwardly extended position from the bearing arm 72, so that cylindrical work may be entered between the contact surfaces for measuring, as shown by the dotted lines.

The bearing arm 72 is provided with a vented chamber 80 into which the spindle 76 extends and a snap ring 81 is secured in a complementary groove in the spindle to engage the frame and thereby limit the extended position of the contact head 77. A nipple 82 is secured in the bearing head and in alignment with the spindle 76. This nipple is provided with a restricted air passage 83 communicating with the chamber 80 and it is adapted to be connected to a suitable pneumatic pressure source through a combined pressure control valve and indicator such as shown in Figs. 1 to 4. The connections may, of course, be made by means of suitable flexible conduits, so that the gauge may be freely movable for hand use in connection with workpieces in any desired position.

A contact post 84 is adjustably mounted in the frame 70 and may be secured in adjusted position by means of a hollow head set screw 85. This post is for the purpose of limiting the position of the caliper over the workpiece, so that the caliper may be positioned to measure the exact diameter thereof.

The operation of this device is substantially identical with the embodiment previously described. Any movement of the spindle 76 varies the flow of air from the nipple 82 into the chamber 80 and out of vent holes 80a associated therewith and therefore varies the back pressure on the air passage 83. This pressure variation will be indicated on the pressure gauge associated with the air pressure regulator such as above described and will be in exact accordance with any variation of the workpiece from a standard dimension.

It will be apparent to one skilled in the art that the device of this invention is susceptible to numerous modifications which may be dependent upon the type of workpiece to be measured and the accuracy desired. For example, the device may be readily modified to make inside measurements as well as outside measurements. If inside measurements are to be taken, then it is usually preferable that the measuring elements be normally tensioned away from each other.

As previously indicated, the instrument of this invention is primarily adapted for taking measurement of workpieces using standard measuring block and the reading on the gauge will indicate the deviation of the workpiece from the standard. If desired the gauge may be calibrated directly in terms of the workpiece measurement.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A pneumatically operated measuring instrument comprising a fixed measuring element, a movable measuring element biased toward the fixed element, a head for mounting the movable element for reciprocable movement with respect thereto, said movable element having one end terminating in a fluid chamber within said head, a fluid passageway communicating with said chamber and being positioned for at least partial closure by said movable element when said movable element is moved away from said fixed element, means for venting fluid from said chamber, means for supplying fluid to said passageway at a constant pressure, and means for indicating the back pressure in said passageway incident to the positioning of said movable element adjacent said passageway whereby the measurement of a dimension of a workpiece disposed between said measuring elements may be indicated.

2. A pneumatically operated measuring instrument comprising a fixed element having a first measuring surface, a movable element having a second measuring surface spring tensioned toward the first measuring surface, a head mounting the movable element in reciprocable relationship thereto, said movable element having one end terminating in a vented chamber within said head, a fluid passageway within said head communicating with said chamber and being positioned for at least partial closure by said one end of said movable element when the latter is moved away from said first measuring surface, means for supplying fluid to said passageway at a constant pressure, and means for indicating the back pressure in said passageway incident to the positioning of said one end of said movable element adjacent the exit of said passageway in said chamber whereby the measurement of a dimension of a workpiece disposed between the measuring surfaces of said elements may be ascertained.

3. A pneumatically operated measuring instrument comprising a fixed measuring element, a movable measuring element biased toward the fixed measuring element, a head for mounting the movable measuring element for reciprocable movement with respect thereto and with respect to said fixed measuring element, said movable measuring element having one end terminating in a vented chamber within said head, a fluid pressure regulator communicating through a passageway with said chamber, said passageway terminating in said chamber and being subjected to at least partial closure by said movable measuring element when the latter is moved away from said fixed measuring element, means for supplying fluid under pressure to said fluid pressure regulator which in turn communicates with said passageway, and means associated with said fluid pressure regulator for indicating the back pressure in said passageway incident to the positioning of said movable element within said chamber adjacent said passageway whereby the measurement of a workpiece disposed between said measuring elements may be ascertained.

4. A measuring head for a pneumatically operated measuring instrument which comprises a main body portion having a fluid passageway extending axially thereof, a cap secured to one end of said main body portion providing a vented chamber therebetween communicating with said passageway, and a spindle slidably mounted in said cap having one end extending into said chamber the other end being adapted to engage a workpiece for measurement, said one end of said spindle being movable in said cap to interrupt at least partially free communication between said passageway and said chamber.

5. A measuring head for a pneumatically operated measuring instrument which comprises a body portion having a fluid passageway and a vented chamber communicating with said passageway, a spindle mounted in said body portion in alignment with said passageway for limited reciprocal movement therein having one end extending into said chamber, the other end being adapted to engage a workpiece for measurement, said one end of said spindle being movable in said body portion at least partially to interrupt free communication between said passageway and said chamber, and a spring normally tensioned to urge said spindle out of communication interrupting position.

6. A measuring device comprising a pair of spaced and opposed measuring elements adapted to receive the workpiece therebetween that is to be measured, a holder for each of said measuring elements, means for slidably urging at least one of said measuring elements toward the other, one of said holders containing a chamber having an orifice connected to a source of fluid pressure and housing a portion of said slidable measuring element so that a surface thereof is adjustably positioned opposite to said orifice, and an indicator responsive to the pressure of the fluid flowing through said orifice, variations in the velocity of the fluid issuing from said orifice being indicated on said indicator whereby variations in the length of the space between the orifice and said housed surface are indicated.

7. A measuring device comprising a pair of spaced and opposed measuring elements adapted to receive the workpiece therebetween that is to be measured, a holder for each of said measuring elements, means for slidably urging at least one of said measuring elements toward the other, one of said holders containing a chamber having an orifice connected to a source of fluid pressure and housing a portion of said slidable measuring element so that a surface thereof is adjustably positioned opposite to said orifice, means for adjustably controlling the pressure and the volume of the fluid issuing from said orifice, and an indicator responsive to the pressure of the fluid flowing through said orifice, variations in the velocity of the fluid issuing from said orifice being indicated on said indicator whereby variations in the length of the space between the orifice and said housed surface are indicated.

8. A measuring device comprising a pair of spaced and opposed measuring elements adapted to receive the workpiece therebetween that is to be measured, a holder for each of said measuring elements, means for slidably urging at least one of said measuring elements toward the other, one orifice connected to a source of fluid pressure and housing a portion of said slidable measuring element so that a surface thereof is adjustably positioned opposite to said orifice, means for limiting the outward movement of the measuring element from said chamber, means for adjustably controlling the pressure and the volume of the fluid issuing from said orifice, and an indicator responsive to the pressure of the fluid flowing through said orifice, variations in the velocity of the fluid issuing from said orifice being indicated on said indicator whereby variations in the length of the space between the orifice and said housed surface are indicated.

9. A measuring device of the class described comprising a measuring element, a holder therefor in which said element is slidably mounted, means for urging said measuring element away from said holder in order to contact firmly with the workpiece that is to be measured, said holder providing a chamber having an orifice connected to a source of fluid pressure and housing a portion of said measuring element so that a surface thereof is adjustably positioned opposite to said orifice, and an indicator responsive to the pressure of the fluid flowing through said orifice, variations in the velocity of the fluid issuing from said orifice being indicated on said indicator whereby variations in the length of the space between the orifice and said housed surface are indicated.

10. A measuring device of the class described comprising a measuring element, a holder therefor in which said element is slidably mounted, means for urging said measuring element away from said holder in order to contact firmly with the workpiece that is to be measured, said holder providing a chamber having an orifice connected to a source of fluid pressure and housing a portion of said measuring element so that a surface thereof is adjustably positioned opposite to said orifice, means for adjusting the pressure and the volume of the fluid flowing through said orifice, and an indicator responsive to the pressure of the fluid flowing through said orifice, variations in the velocity of the fluid issuing from said orifice being indicated on said indicator whereby variations in the length of the space between the orifice and said housed surface are indicated.

11. A measuring device of the class described comprising a measuring element, a holder therefor in which said element is slidably mounted, means for urging said measuring element away from said holder in order to contact firmly with the workpiece that is to be measured, said holder providing a chamber having an orifice connected to a source of fluid pressure and housing a portion of said measuring element so that a surface thereof is adjustably positioned opposite to said orifice, means for adjusting the pressure and the volume of the fluid flowing through said orifice, means for preventing the ejection of said measuring element from said chamber so that the said housed surface is retained in said chamber, and an indicator responsive to the pressure of the fluid flowing through said orifice, variations in the velocity of the fluid issuing from said orifice being indicated on said indicator whereby variations in the length of the space between the orifice and said housed surface are indicated.

12. A measuring device of the class described comprising a measuring element, a holder therefor in which said element is slidably mounted, means urging said measuring element away from said holder in order to contact firmly with the workpiece that is to be measured, said holder providing a chamber having an orifice connected to a source of fluid pressure and housing a portion of said measuring element so that a surface thereof is adjustably positioned opposite to said orifice, means for controllably adjusting the pressure and the volume of the fluid flowing through said orifice to constant values, said chamber being vented through a restricted opening to the atmosphere to ensure the flowing of the fluid from the said orifice except when the latter is fully closed by said housed surface of the measuring element, means for preventing the ejection of said measuring element from said chamber so that the said housed surface is retained in said chamber, and an indicator responsive to the pressure of the fluid flowing through said orifice, variations in the velocity of the fluid issuing from said orifice being indicated on said indicator whereby variations in the length of the space between the orifice and said housed surface are indicated.

13. A measuring device comprising two spaced and opposed measuring elements adapted to receive the workpiece therebetween that is to be measured, a holder for one of said measuring elements wherein the latter is slidably mounted, said holder housing a chamber into which one end of said measuring element projects, spring means for urging said measuring element out of said chamber, means for limiting the movement of said measuring element, said chamber having an orifice connected to a source of fluid pressure and positioned opposite to the end of the said measuring element that projects into the said chamber, a source of fluid pressure connected to said orifice, means for maintaining the supply of said fluid at a predetermined constant pressure and predetermined constant volume, and an indicator responsive to the pressure of the fluid flowing through said orifice, variations in the velocity of the fluid issuing from said orifice as the measuring element approaches and recedes from said orifice being indicated on said indicator whereby variations in the length of the space between the orifice and the adjacent end of the measuring element are indicated.

14. A workpiece measuring device of the class described comprising a fluid pressure apparatus including a chamber having an inlet and an outlet, a source of fluid pressure connected to said inlet, means for controllably adjusting the pressure and the volume of the fluid that issues from said outlet, an indicator responsive to the fluid pressure obtaining at said outlet, a pair of spaced measuring elements adapted to receive the workpiece therebetween that is to be measured, one of said measuring elements being manually adjustable relative to the second said measuring element, and a holder for said second measuring element wherein the latter is slidably mounted, means for urging said second measuring element toward the other measuring element of said pair, said holder having a chamber provided with an orifice connected to said outlet of the said first chamber and said orifice being disposed opposite to that end of said measuring element which projects into said second chamber so that variations in the velocity of the fluid issuing from said orifice are indicated on said indicator whereby variations in the length of the space between the orifice and the projecting end of said measuring element are indicated.

15. A pneumatically operated measuring instrument comprising a fixed measuring element, a cooperating movable measuring element biased toward said fixed element, a head providing a chamber, said movable element being slidably mounted in said head and having a portion thereof housed in said chamber and said head being provided with a fluid passageway that terminates with its outlet being adjacent to the portion of said movable element that is housed in said chamber, means for supplying fluid to said passageway at a constant pressure, the position of said movable element relative to said fixed element controlling the rate of flow of the fluid through said outlet, and means for indicating the back pressure in said passageway incident to the positioning of said movable element with respect to said outlet whereby the measurement of a dimension of a workpiece clamped between said measuring elements may be indicated.

16. A pneumatically operated outside caliper measuring instrument comprising a frame having opposed caliper arms between which a workpiece to be measured may be inserted, a stationary element mounted upon one of said arms and providing a first measuring surface, a co-operating movable element providing a second measuring surface that is positioned opposite to said first measuring surface and spaced therefrom whereby the workpiece to be measured may be received between said measuring surfaces, said movable element being slidably mounted in the other of said arms and normally biased toward said first measuring surface, the said second arm being provided with a restrictedly vented chamber wherein the other end of said movable element is received, and said vented chamber communicating with a fluid passageway that terminates adjacent to the end of said movable element that is received in said chamber and that is so positioned with respect to the inlet of said fluid passageway within said chamber that partial closure thereof is effected to varying degrees when the relative positions of said measuring surfaces are varied with respect to each other, means for supplying fluid at a constant pressure to said passageway, and means for indicating the back pressure of the fluid in said passageway whereby the measurement of a dimension of the workpiece disposed between the said measuring surfaces may be indicated.

17. An outside caliper measuring device comprising two caliper elements each having a contact surface and said surfaces being spaced apart to receive a workpiece therebetween that is to be measured, at least one of said caliper elements being movable with respect to the other of said caliper elements to enable workpieces of different dimensions within limits to be disposed between the said contact surfaces, said movable caliper element being slidably supported in a holder having a pressure chamber wherein the end of said movable caliper element opposite to its corresponding contact surface is received, and said chamber being connected through an orifice to a fluid pressure line, the end of said movable caliper element housed in said chamber being positioned opposite to said orifice whereby the back pressures obtaining in said fluid pressure line are varied in accordance with the distances between said orifice and said movable caliper element, which distances vary according to the thicknesses of the workpieces to be measured, and means to indicate variations in the fluid pressures obtaining in said pressure line.

FRED W. KUPPERSMITH.

Certificate of Correction

Patent No. 2,397,494. April 2, 1946.

FRED W. KUPPERSMITH

It is hereby certified that error appears in the printed specification of the above numbered patent requiring correction as follows: Page 4, second column, line 53, claim 8, before "orifice" insert *of said holders containing a chamber having an*; and that the said Letters Patent should be read with this correction therein that the same may conform to the record of the case in the Patent Office.

Signed and sealed this 6th day of August, A. D. 1946.

[SEAL]

LESLIE FRAZER,
*First Assistant Commissioner of Patents.* movable element providing a second measuring surface that is positioned opposite to said first measuring surface and spaced therefrom whereby the workpiece to be measured may be received between said measuring surfaces, said movable element being slidably mounted in the other of said arms and normally biased toward said first measuring surface, the said second arm being provided with a restrictedly vented chamber wherein the other end of said movable element is received, and said vented chamber communicating with a fluid passageway that terminates adjacent to the end of said movable element that is received in said chamber and that is so positioned with respect to the inlet of said fluid passageway within said chamber that partial closure thereof is effected to varying degrees when the relative positions of said measuring surfaces are varied with respect to each other, means for supplying fluid at a constant pressure to said passageway, and means for indicating the back pressure of the fluid in said passageway whereby the measurement of a dimension of the workpiece disposed between the said measuring surfaces may be indicated.

17. An outside caliper measuring device comprising two caliper elements each having a contact surface and said surfaces being spaced apart to receive a workpiece therebetween that is to be measured, at least one of said caliper elements being movable with respect to the other of said caliper elements to enable workpieces of different dimensions within limits to be disposed between the said contact surfaces, said movable caliper element being slidably supported in a holder having a pressure chamber wherein the end of said movable caliper element opposite to its corresponding contact surface is received, and said chamber being connected through an orifice to a fluid pressure line, the end of said movable caliper element housed in said chamber being positioned opposite to said orifice whereby the back pressures obtaining in said fluid pressure line are varied in accordance with the distances between said orifice and said movable caliper element, which distances vary according to the thicknesses of the workpieces to be measured, and means to indicate variations in the fluid pressures obtaining in said pressure line.

FRED W. KUPPERSMITH.

Certificate of Correction

Patent No. 2,397,494.

April 2, 1946.

FRED W. KUPPERSMITH

It is hereby certified that error appears in the printed specification of the above numbered patent requiring correction as follows: Page 4, second column, line 53, claim 8, before "orifice" insert *of said holders containing a chamber having an*; and that the said Letters Patent should be read with this correction therein that the same may conform to the record of the case in the Patent Office.

Signed and sealed this 6th day of August, A. D. 1946.

[SEAL]

LESLIE FRAZER,
*First Assistant Commissioner of Patents.*